(12) United States Patent
Lee

(10) Patent No.: US 10,315,512 B2
(45) Date of Patent: Jun. 11, 2019

(54) FUEL GAS STORAGE TANK AND METHOD OF FILLING THE SAME

(71) Applicant: Alternative Fuel Containers, LLC, Southfield, MI (US)

(72) Inventor: Joong-Kyu Lee, Chatham (CA)

(73) Assignee: Alternative Fuel Containers, LLC, Southfield, MI (US)

( * ) Notice: Subject to any disclaimer, the term of this patent is extended or adjusted under 35 U.S.C. 154(b) by 358 days.

(21) Appl. No.: 15/302,810

(22) PCT Filed: May 6, 2015

(86) PCT No.: PCT/US2015/029508
§ 371 (c)(1),
(2) Date: Oct. 7, 2016

(87) PCT Pub. No.: WO2015/171795
PCT Pub. Date: Nov. 12, 2015

(65) Prior Publication Data
US 2017/0028842 A1 Feb. 2, 2017

Related U.S. Application Data

(60) Provisional application No. 61/989,291, filed on May 6, 2014.

(51) Int. Cl.
*B60K 15/073* (2006.01)
*B60K 15/03* (2006.01)
(Continued)

(52) U.S. Cl.
CPC ...... *B60K 15/073* (2013.01); *B60K 15/03006* (2013.01); *F17C 1/00* (2013.01);
(Continued)

(58) Field of Classification Search
CPC ............ B60K 15/03006; B60K 15/073; B60K 2015/03315; B60K 2015/03236;
(Continued)

(56) References Cited

U.S. PATENT DOCUMENTS 5,758,796 A * 6/1998 Nishimura ................ F17C 1/06
220/590
6,432,379 B1 8/2002 Heung
(Continued)

FOREIGN PATENT DOCUMENTS

JP 2005282828 A 10/2005

OTHER PUBLICATIONS

Search Report and Written Opinion of the International Searching Authority (ISA/KR) for PCT/US2015/029508 dated Aug. 11, 2015.

*Primary Examiner* — Timothy L Maust
*Assistant Examiner* — Timothy P. Kelly
(74) *Attorney, Agent, or Firm* — Reising Ethington P.C.

(57) ABSTRACT

A fuel gas storage tank is disclosed that can store fuel gas, such as natural gas or hydrogen, in a solid state. The fuel gas storage tank includes a shell having a tank interior, a fuel gas storage material housed within the tank interior, one or more fuel gas injecting tubes, and one or more fuel gas collecting tubes. Each of the fuel gas injecting tube(s) and the fuel gas collecting tube(s) is permeable to fuel gas and is disposed in the tank interior and surrounded by the fuel gas storage material. And, within the tank interior, the one or more fuel gas injecting tubes and the one or more fuel gas collecting tubes are not directly connected to one another.

18 Claims, 4 Drawing Sheets

(51) Int. Cl.
*F17C 1/00* (2006.01)
*F17C 5/06* (2006.01)
*F17C 11/00* (2006.01)

(52) U.S. Cl.
CPC .............. *F17C 5/06* (2013.01); *F17C 11/005* (2013.01); *F17C 11/007* (2013.01); *B60K 2015/03019* (2013.01); *B60K 2015/03236* (2013.01); *B60K 2015/03315* (2013.01); *F17C 2201/0119* (2013.01); *F17C 2201/035* (2013.01); *F17C 2201/056* (2013.01); *F17C 2201/06* (2013.01); *F17C 2203/0643* (2013.01); *F17C 2203/0646* (2013.01); *F17C 2203/0648* (2013.01); *F17C 2203/0663* (2013.01); *F17C 2221/012* (2013.01); *F17C 2221/033* (2013.01); *F17C 2225/0138* (2013.01); *F17C 2225/035* (2013.01); *F17C 2265/065* (2013.01); *F17C 2270/0168* (2013.01)

(58) Field of Classification Search
CPC ......... B60K 2015/03019; F17C 11/007; F17C 11/005; F17C 5/06
See application file for complete search history.

(56) References Cited

U.S. PATENT DOCUMENTS

| | | | |
|---|---|---|---|
| 6,503,584 B1 * | 1/2003 | McAlister | F17C 1/02 220/560.04 |
| 2009/0127137 A1 | 5/2009 | Golz et al. | |
| 2010/0006454 A1 | 1/2010 | Gruenwald et al. | |
| 2010/0024542 A1 | 2/2010 | Yen et al. | |

* cited by examiner

FUEL GAS STORAGE TANK AND METHOD OF FILLING THE SAME

CROSS-REFERENCE TO RELATED APPLICATIONS

This application claims the benefit of U.S. provisional application No. 61/989,291, filed on May 6, 2014, the entire contents of which are incorporated herein by reference.

TECHNICAL FIELD

The technical field of this disclosure relates generally to tanks for storing fuel gas such as, for example, natural gas or hydrogen gas.

BACKGROUND

Fuel gases, such as natural gas and hydrogen gas, are promising alternatives to the traditional petrol-based energy sources consumed by motor vehicles. Such fuel gases generally burn cleaner than traditional petroleum-based gasoline and diesel fuels and, thus, are better for the environment. One challenge encountered with the use of fuel gases, however, is how to store a sufficient amount of fuel gas on-board an automotive vehicle so that reasonable driving distances can be achieved between fill-ups. To this end, two storage approaches are typically employed when attempting to satisfy mobile on-board vehicle fuel gas storage needs: storing fuel gas in a compressed state or a solid state. When stored in a compressed state, the fuel gas is compressed and stored at a high pressure within the tank, typically at a pressure in excess of 200 bar. And when stored in a solid state, the fuel gas is stored on a fuel gas storage material that increases the volumetric and gravimetric energy density of the gas within the available tank space such that it compares favorably to compressed fuel gas but at a much lower pressure.

A design consideration that factors into the commercial demand and viability of on-board fuel gas storage tanks is "conformability." The concept of tank conformability relates to the design flexibility of the tank structure and how easily it can be adapted to fit the available packing requirements across many different vehicle platforms. The fuel gas storage tanks employed to date—for both compressed and solid state fuel gas storage—have largely been shaped as cylinders or spheres and are oftentimes made of thick and/or heavy materials. These tank constructions have been used to resist the forces exerted by the associated pressures from inside the tanks. But cylindrically- and spherically-shaped storage tanks are generally considered to be non-conformable since they do not always satisfy packaging requirements demanded in automotive vehicles and/or they are unable to fully utilize the space designated for the tank on a vehicle platform.

As such, there exists a need for a fuel gas storage tank that not only stores a sufficient quantity of fuel gas to enable acceptable driving distances between fill-ups, but is also conformable to many different types of vehicle platforms. A fuel gas storage tank that possesses such attributes would simplify the integration of fuel gas, such as natural gas and hydrogen gas, into motor vehicles—especially passenger cars and trucks—as a source of power for operating and propelling the vehicle either alone or in combination with other power sources such as, for example, traditional petrol-based fuels (e.g., gasoline or diesel fuel) and lithium ion batteries. And, practically speaking, the flexibility and design freedom to customize the size and shape of the fuel gas storage tank to fit individual vehicle packaging requirements would also make fuel gas technologies a more economically attractive option for motor vehicle applications.

SUMMARY OF THE DISCLOSURE

A fuel gas storage tank is disclosed that can store fuel gas, such as natural gas or hydrogen, in a solid state. The fuel gas storage tank includes a shell having a tank interior, a fuel gas storage material housed within the tank interior, one or more fuel gas injecting tubes, and one or more fuel gas collecting tubes. Each of the fuel gas injecting tube(s) and the fuel gas collecting tube(s) is permeable to fuel gas and is disposed into the tank interior and within the fuel gas storage material. Moreover, each of the fuel gas injecting tube(s) and the fuel gas collecting tube(s) is preferably constructed as a filter tube that is hermetically coupled to opposed portions of the shell so as to counteract internal forces acting on the shell from the tank interior as a result of solid state fuel gas storage. Such coupling provides enough structural reinforcement to the shell that portions of the shell or entire defined walls of the shell can be generally planar. This type of flexibility renders the disclosed fuel gas storage tank conformable and, thus, able to efficiently accommodate many different types of packaging and space constraints that may be placed on the fuel gas storage tank, particularly in the motor vehicle industry.

DETAILED DESCRIPTION

Several preferred embodiments of a fuel gas storage tank are disclosed that address challenges associated with storing fuel gas aboard a motor vehicle—namely, the sometimes demanding and even inflexible packaging and weight requirements specified for the tank. The fuel gas storage tank is thus adapted to store useable quantities of fuel gas in a solid state at relatively low operating pressures compared to compressed fuel gas storage. As will be described in more detail below, the fuel gas storage tank is "conformable" in the sense that its shape is not limited to cylinders and spheres, though these shapes are still acceptable possibilities, and instead its shape can include generally planar portions and surfaces that may better accommodate packaging and spacing needs in motor vehicle applications. Furthermore, thinner and lighter materials can be used to make the fuel gas storage tank, if desired, since the tank is designed to better resist internal forces exerted by the fuel gas stored inside the tank. The term "generally planar" as used herein signifies that a dimensionally exact flat surface is not necessitated, and instead denotes that such a surface more closely resembles a planar surface than a cylindrical or a spherical surface.

The fuel gas storage tank is useful in storing fuel gases, such as natural gas or hydrogen, that are fed to a fuel-consuming device to generate power for propelling and operating the motor vehicle. Natural gas is a fuel gas whose largest gaseous constituent is methane ($CH_4$). The preferred type of natural gas that is stored in the fuel gas storage tank is refined natural gas that includes 90 wt. % or greater, and preferably 95 wt. % or greater, methane. The other 5 wt. % or less may include varying amounts of natural impurities—such as other higher-molecular weight alkanes, carbon dioxide, and nitrogen—and/or added impurities. Hydrogen gas is also a well known fuel gas having the chemical formula $H_2$. In many instances, such as when the fuel-consuming device is a fuel cell, the hydrogen gas that is stored in the fuel gas storage tank has a purity of at least 99.0 wt. % $H_2$.

Figure 1:
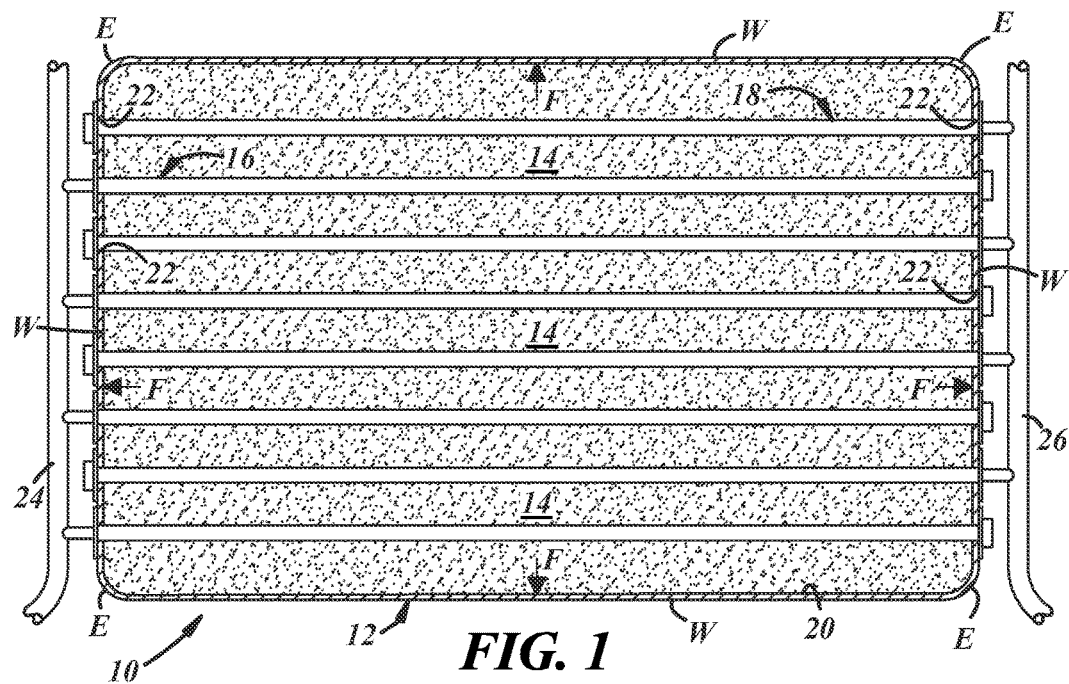
FIG. 1 is a schematic cross-sectional illustration of the disclosed fuel gas storage tank according to one embodiment.

A schematic embodiment of the fuel gas storage tank is illustrated in FIG. 1 and is identified by reference numeral 10. The fuel gas storage tank 10 can be installed and supported on chassis of a motor vehicle and is constructed to supply fuel gas to a fuel-consuming device (not shown) as needed. The associated fuel-consuming device may be an internal combustion engine, a fuel cell, or any other type of device that can generate power using the fuel gas. The fuel gas storage tank 10 can have different designs, shapes, and components depending upon the capacity, packaging, and weight specifications of the particular motor vehicle onto which the tank 10 will be installed. But, in general, the fuel gas storage tank 10 includes a shell 12, a fuel gas storage material 14, at least one fuel gas injecting tube 16, and at least one fuel gas collecting tube 18.

The shell 12 defines a tank interior 20 and may be constructed of any suitable material including of a metal, such as stainless steel or an aluminum alloy, or a fiber-reinforced polymer, such as carbon-reinforced nylon, or some other material of suitable strength and durability. A few particularly preferred materials that may be used to construct the shell 12 include SUS304 grade stainless steel or AA5083-0 aluminum alloy. The material selected for construction of the shell 12 can be lighter and/or thinner than those which have been previously used for conventional gas storage tanks since, as will be further described below, the fuel gas injecting and fuel gas collecting tubes 16, 18 support and structurally reinforce the shell 12 so that the structural demands placed on the inherent material properties (e.g., strength) of the shell material itself are ultimately lessened.

The shell 12 includes walls W that define multiple openings 22 through which the fuel gas injecting tube(s) 16 and the fuel gas collecting tube(s) 18 are received into the tank interior 20. The openings 22 can be formed during manufacture of the shell 12, they can be drilled into the walls W after the shell 12 has been made and/or assembled into its final shape, or they can be formed another way depending on the material of the shell 12. When fuel gas is stored within the shell 12, outwardly-directed forces F act against the shell walls W from inside the shell 12 due to the pressure of the stored fuel gas contained within the tank interior 20. The forces F can impart bending stresses, hoop stresses, and other stresses on the walls W. As will be described below in greater detail, some or all of the fuel gas injecting tube(s) 16 and/or the fuel gas collecting tube(s) 18 are hermetically coupled to the walls W in a way that counteracts the forces F imparted to the walls W by the stored fuel gas, and they do so to such an extent that one or more walls W of the shell 12 can include generally planar portions or surfaces and need not necessarily be cylindrically- and spherically-shaped. The walls W can also have a thickness that is rather small compared to conventional practice. For example, the thickness of the walls W can range from about 3 mm to about 10 mm, or more narrowly from about 3 mm to 5 mm.

In the schematic representation of the fuel gas storage tank 10 depicted in FIG. 1, the shell 12 is shown having a rectangular shape with generally planar walls W. The walls W intersect one another along edges E that meet at corners. The edges E and corners of the shell 12 are preferably rounded for improved resistance against bending stresses experienced at those regions of the shell 12 due to the pressure of the fuel gas held inside the tank 10, which can range from about 35 bar to about 60 bar for adsorbed natural gas storage, or can range from about 10 bar to about 100 bar for hydrogen storage. While the overall shape and profile of the shell 12 can vary from what is shown here, the shell 12 may nonetheless have a three-dimensional shape with any number of generally planar and non-planar walls or walls that have generally planar portions or surfaces. The option to employ walls with at least generally planar portions or surfaces in the construction of the shell 12—which allows the shell 12 to assume any of a wide variety of shapes beyond the cylindrical and spherical shapes that have conventionally been used for storage—allows the tank 10 to be designed in a way that best conforms to the space allotted for the tank 10 on a particular vehicle platform. Of course, the shell 12 could assume different and more conventional shapes such as a spherical shape made of a single wall or a cylindrical shape with a cylinder wall and two spherical end walls, if desired.

The fuel gas storage material 14 is contained within the tank interior 20 in the available space outside of the fuel gas injecting tube(s) 16 and the fuel gas collecting tube(s) 18. The fuel gas storage material 14 comprises any material that is capable of reversibly storing the desired fuel gas in a solid state through any storage mechanism (e.g., adsorption, chemical uptake, etc.). Natural gas and hydrogen gas are two notable types of fuel gas that may be stored in a solid state. The fuel gas storage material 14 may, accordingly, be an ANG storage material if the fuel gas is natural gas or a hydrogen storage material if the fuel gas is hydrogen gas. An ANG storage material and a hydrogen storage material may be incorporated into the tank interior 20 in any suitable physical structure including granules, pellets, and/or powder, to name but a few options.

An ANG storage material (for storing natural gas) may be a porous adsorbent material that stores natural gas by way of adsorption, and it preferably increases the volumetric and gravimetric energy density of the gas within the available tank space such that it compares favorably to compressed natural gas but at a much lower pressure of 60 bar or less. Some specific examples of materials that may constitute some or all of the ANG storage material are activated carbon, metal-organic-frameworks (MOFs), or porous polymer networks (PPNs). Activated carbon is a carbonaceous substance, typically charcoal, that has been "activated" by known physical or chemical techniques to increase its porosity and surface area. A metal-organic-framework is a high surface area coordination polymer having an inorganic-organic framework, often a three-dimensional network, that includes metal ions (or clusters) bound by organic ligands. A porous polymer network is a covalently-bonded organic or organic-inorganic interpenetrating polymer network that, like MOFs, provides a porous and typically three-dimensional molecular structure.

Any of a wide variety of MOFs and PPNs may be used as some or all of the ANG storage material. Some notable MOFs and PPNs that may be used as the ANG storage material are disclosed in R. J. Kuppler et al., Potential applications of metal-organic frameworks, Coordination Chemistry Reviews 253 (2009) pp. 3042-66, D. Yuan et al., Highly Stable Porous Polymer Networks with Exceptionally High Gas-Uptake Capacities, Adv. Mater. 2011, vol. 23 pp. 3723-25, W. Lu et al., Porous Polymer Networks: Synthesis, Porosity, and Applications in Gas Storage/Separation, Chem. Mater. 2010, 22, 5964-72, and H. Wu et al., Metal-Organic Frameworks with Exceptionally High Methane Uptake: Where and How Methane is Stored?, Chem. Eur. J. 2010, 16, 5205-14. Of course, a wide variety of MOFs and PPNs that can adsorptively store natural gas (and other fuel gases such as hydrogen gas) are commercially available, and many others are constantly being researched, developed, and brought to market.

A hydrogen storage material (for storing hydrogen gas) may, in one instance, have the ability to reversibly store hydrogen gas as a hydride through chemical uptake. The hydrogen storage material—like before with the ANG storage material—preferably increases the volumetric and gravimetric energy density of the gas within the available tank space such that it compares favorably to compressed hydrogen gas but at a much lower pressure of 100 bar or less. Materials that can store hydrogen gas through chemical uptake include metal hydrides and complex metal hydrides. One specific example of a suitable metal hydride is lithium hydride (LH). Complex metal hydrides may include various known alanates and amides. Some specific complex metal hydrides include sodium alanate ($NaAlH_4$), lithium alanate ($LiAlH_4$), magnesium nickel hydride ($Mg_2NiH_4$), and lithium amide ($LiNH_2$). Moreover, in addition to those hydrogen storage materials that rely on chemical uptake to store hydrogen gas as a hydride, other materials exist that can adsorptively store hydrogen gas including MOFs and PPNs that have an affinity for hydrogen gas. For example, some of the porous MOFs and PPNs referenced in the above literature may be used for adsorptive hydrogen gas storage.

The one or more fuel gas injecting tubes 16 and the one or more fuel gas collecting tubes 18 are disposed within and the tank interior 20 and are permeable to fuel gas. The fuel gas injecting tube(s) 16 and the fuel gas collecting tube(s) 18 preferably extend through the tank interior 20 between opposed portions of the shell 12 while being surrounded and enveloped by the fuel gas storage material 14. While the fuel gas injecting tube(s) 16 and the fuel gas collecting tube(s) 18 can have the same or different constructions—examples of which are described below—the one or more fuel gas injecting tubes 16 fluidly communicate with a fuel gas feed line 24 and the one or more fuel gas collecting tubes 18 fluidly communicate with a fuel gas extraction line 26. The fuel gas feed line 24 delivers fuel gas to the fuel gas injecting tube(s) 16 from an external source such as, for example, a home or retail refueling station. The fuel gas extraction line 26, on the other hand, removes fuel gas from the fuel gas collecting tube(s) 18 and carries the fuel gas away from the storage tank 10 so that it can be cooled and re-circulated back into the tank 10, returned to a common reservoir, or handled in some other desired way. Process equipment, such as pumps, can be associated with the fuel gas storage tank 10 to facilitate such fuel gas flow within the fuel gas feed and extraction lines 24, 26.

The one or more fuel gas injecting tubes 16 and the one or more fuel gas collecting tubes 18 preferably have the same basic construction. Each of the fuel gas injecting tube(s) 16 and the fuel gas collecting tube(s) 18 is preferably a filter tube 28 as shown in FIGS. 2-5. The filter tube 28 is multi-functional in that it (1) transports fuel gas into and out of the tank interior 20 of the fuel gas storage tank 10, (2) permits fuel gas to diffuse into or out of the tank interior 20, (3) permits heat to be transferred into or out of the tank interior 20, and (4) supports the shell 12 against the outwardly-directed forces F acting from within the tank interior 20. Because of the ascribed multi-functionality of the filter tube 28 and its use as both the fuel gas injecting tube(s) 16 and the fuel gas collecting tube(s) 18, the fuel gas storage tank 10 is conformable in nature and may also be filled with fuel gas relatively quickly. The fuel gas storage tank 10 can be filled quickly since the filter tubes 28 provide a mechanism for rejecting heat out of the tank 10 that is generated by the exothermic adsorption/chemical uptake of the fuel gas by the fuel gas storage material 14.

Figure 2:
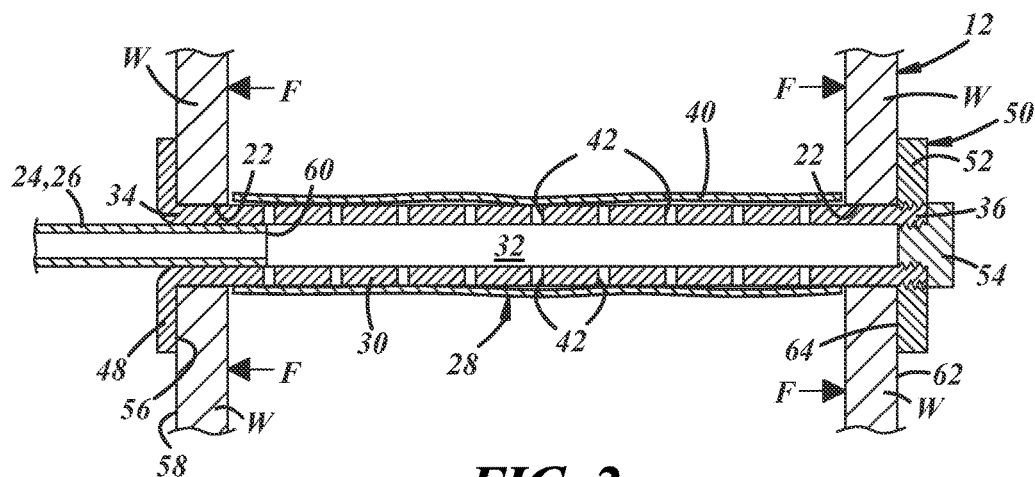
FIG. 2 is a cross-sectional illustration of one embodiment of a filter tube that can be used as the fuel gas injecting tube(s) and/or the fuel gas collecting tube(s)

The filter tube 28 shown in FIG. 2 includes a structural wall 30 that defines a flow passage 32 extending from a first end 34 to a second end 36 of the filter tube 28, and may further include a membrane 40 carried by the structural wall 30. Fuel gas can flow within and along the flow passage 32 without having to directly contact and navigate the fuel gas storage material 14 contained in the tank interior 20. The structural wall 30 and the membrane 40 together allow fuel gas to diffuse between the flow passage 32 defined on the inside the filter tube 28 and the tank interior 20 defined on outside of the filter tube 28 where the fuel gas storage material 14 is contained. The structural wall 30 and the membrane 40 also allow the transfer of heat into and out of the flow passage 32. For example, when adding fuel gas into the tank 10, the heat generated during the solid state fuel gas storage process (e.g., exothermic adsorption of natural gas or exothermic chemical uptake of hydrogen gas) is able to be transferred from the tank interior 20 to inside the filter tube 28 (when the filter tube 28 is acting as a fuel gas collecting tube 18 that fluidly communicates with the fuel gas extraction line 26) where it can be absorbed and carried away by the fuel gas flowing through the flow passage 32 and ultimately out of the tank interior 20. Several embodiments of the filter tube 28 are shown in FIGS. 2-5.

The structural wall 30 is preferably cylindrical in shape and marked with openings in the form of small holes 42 to facilitate the passage of fuel gas through the wall 30. The holes 42 can be regularly spaced along and around the wall 30 between the first and second ends 34, 36 of the filter tube 28, as shown. In some examples, the flow passage 32 can have a diameter ranging from about 3 mm to about 30 mm or from about 5 mm to about 10 mm, the holes 42 can have a diameter ranging from about 10 µm to about 2 mm, and the structural wall 30 can have a thickness from about 1.0 mm to about 5.0 mm. Still, in other examples, the flow passage 32 and the holes 42 could have diameters of different values, and the structural wall 30 may have a different thickness, depending on the size of the fuel gas storage tank 10 and the properties of the fuel gas storage material 14, among other possible factors. The structural wall 30 can be made of the same material as the shell 12, including the metal and plastic materials set forth above, or it could be composed of some other material that has suitable strength and durability.

The membrane 40 carried by the structural wall 30 provides a finer filtration medium compared to the openings in the structural wall 30. The membrane 40 is preferably a micro- or ultra-filtration material or film that is fuel gas permeable so that fuel gas can diffuse through the membrane 40 and into or out of the filter tube 28. A network of interconnected pores preferably traverses a thickness of the membrane 40, which typically ranges from about 20 μm to about 2 mm. While the pores are sized to allow diffusion of the fuel gas between the flow passage 32 of the filter tube 28 and the tank interior 20 that houses the fuel gas storage material 14, their size may also be tailored to preclude pieces of the fuel gas storage material 14 above a certain size from entering into the flow passage 32. For instance, the pores of the membrane 40 may be sized to exclude particles of the fuel gas storage material 14 down to a certain size that may result from fragmentation—which can be caused over time by temperature, pressure, and load cycling—from passing through the membrane 40. In some examples, an average pore size of about 10 μm to about 50 μm may be suitable. The membrane 40 need not, however, necessarily prevent all traces of the fuel gas storage material 14 from passage into the filter tube 28 from the tank interior 20 as it may be acceptable for tiny particles of the fuel gas storage material 14 to enter the flow passage 32 without measurably impacting the effectiveness of the fuel gas storage tank 10 and the filter tubes 28.

A number of micro- or ultra-filtration materials exist and are known in the art to be fuel gas permeable. Of these many choices, the membrane 40 is preferably a hydrophilic zeolite such as ZSM-5, which can help reduce water contamination of the fuel gas storage material 14, or an organic polymer-based membrane. The membrane 40 can be carried by the structural wall 30 in different ways. Referring to FIG. 2, for example, the membrane 40 is overlapped around the outside of the structural wall 30. Here, the membrane 40 surrounds all sides of the structural wall 30 and spans longitudinally over the extent of the wall 30 exposed to the fuel gas storage material 14. In another embodiment, the membrane 40 can be carried within the structural wall 30 on an inside circumferential surface of the wall 30 and within the flow passage 32, or it may be sandwiched between the structural wall 30 and another component of the filter tube 28. The membrane 40 can be appended to the structural wall 30 by any known technique.

The filter tube 28 may assume other constructions that render it fuel gas permeable besides what has been previously described. For example, in other embodiments, the filter tube 28 may include additional materials or discrete layers besides the structural wall 30 and the membrane 40. Or it may include the structural wall 30 alone without the membrane 40 in cases where the structural wall 30 itself can suitably preclude pieces of the fuel gas material 14 above a certain size—e.g., pieces that are above some predetermined size that preferably but not necessarily lies between of 10 μm and 50 μm—from entering the flow passage 32 and obstructing flow in the filter tube 28. Additionally, the filter tube 28 may include the membrane 40 alone without the structural wall 30 in cases where the membrane 40 is sturdy enough and can suitably preclude pieces of the fuel gas material 14 above a certain size from entering the flow passage 32 and obstructing flow in the filter tube 28. In such instances, the thickness of the membrane 40 may have to be increased to account for the absence of the structural wall 30. Whether the filter tube 28 includes both the structural wall 30 and membrane 40, or just one of those components, the filter tube 28 need not necessarily prevent all traces of fuel gas storage material 14 from entering the flow passage 32, as previously explained.

Figure 3:
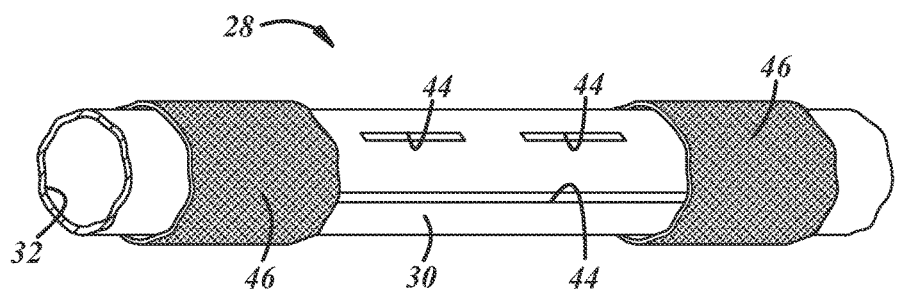
FIG. 3 is a cross-sectional illustration of another embodiment of a filter tube that can be used as the fuel gas injecting tube(s) and/or the fuel gas collecting tube(s)

FIG. 3 depicts another embodiment of the filter tube 28. Here, the structural wall 30 has openings in the form of one or more elongated slits 44. In different examples, there could be an elongated slit 44 spanning axially along the structural wall 30, as illustrated by the lowermost slit 44 in FIG. 3, or there could be multiple elongated slits 40 arranged regularly or randomly around the structural wall 30, as illustrated by the uppermost slits 44 in FIG. 3, or there could be a combination thereof as well as openings of other shapes. The slitted structural wall 30 could constitute the filter tube 28 by itself, or, as partially shown in FIG. 3, a mesh structure 46 could be provided over the structural wall 30. The mesh structure 46 is depicted broken away to expose the structural wall 30 underneath, but could span completely across the structural wall 30 to fully surround the wall 30. In the embodiment illustrated, the mesh structure 46 is made of metal, and could be composed of carbon steel or stainless steel such as SUS304 stainless steel. The mesh structure may be a wire or woven mesh that defines gas-navigable openings, and it may function similarly to the membrane 40 described above in that it permits fuel gas to diffuse through it while at the same time precluding pieces of the fuel gas material 14 above a certain size—e.g., pieces that are above some predetermined size that preferably but not necessarily lies between 10 μm and 50 μm—from entering the flow passage 32 and obstructing flow in the filter tube 28.

In still another embodiment, the mesh structure 46 could constitute the filter tube 28 by itself and without the structural wall 30. To facilitate the diffusion of fuel gas, the mesh structure 46 can have openings defined by interconnected wires or woven metal or it can have openings in the form of perforations. If the mesh structure 46 defines openings of less than 50 μm in diameter, for example, then the mesh structure 46 may be sufficient to permit fuel gas diffusion between the flow passage 32 and the tank interior 20 while also excluding pieces of the fuel gas storage material 14 above a certain size from entering into the flow passage 26. If, however, the openings of the mesh structure 46 are deemed to be too large, the membrane 40 described above may be carried on the inside or outside of the mesh structure 46 to preclude the unwanted entry of pieces of the fuel gas storage material 14 into the flow passage 32. If the mesh structure 46 is used as all or part of the filter tube 28, commercial providers of the structure could include the company Haver & Boecker of OELDE Germany, or Fratelli Mariani S.p.A. of Cormano Italy, as well as other companies.

However constructed—whether as filter tubes 28 or some other fuel gas permeable guide structures—the one or more fuel gas injecting tubes 16 and the one or more fuel gas collecting tubes 18 are not directly connected to one another within the tank interior 20; that is, a continuously navigable conduit having an internal passageway with a defined cross-section through which fuel gas can flow without contacting the fuel gas storage material 14 is not present between the fuel gas injecting tube(s) 16 and the fuel gas collecting tube(s). Rather, to exchange fuel gas between the fuel gas injecting tube(s) 16 and the fuel gas collecting tube(s), the fuel gas must navigate the tank interior 20 while being exposed to the fuel gas storage material 14 such that the fuel gas diffuses through the interstitial spaces (capillary system) of the fuel gas storage material 14 and/or the internal pore system of the fuel gas storage material crystals in order to pass from the fuel gas injecting tube(s) 16 to the fuel gas collecting tube(s) 18 or vice versa. The two types of tubes 16, 18 thus introduce (or source) and remove (or sink) fuel gas from the common space within the tank interior 20 as opposed to being directly connected in a way that provides a continuously defined conduit or conduits to facilitate bulk fuel gas flow between the fuel gas feed line 24 and the fuel gas extraction line 26.

The number and arrangement of the fuel gas injecting tube(s) 16 and the fuel gas collecting tube(s) 18 within the tank interior 20 is subject to great variability. In FIG. 1, for instance, the fuel gas storage tank 10 is shown having only a few of the fuel gas injecting tubes 16 and the fuel gas collecting tubes 18 for the sake of simplicity. In practical and commercial applications of the fuel gas storage tank 10, however, a lesser or greater number of the fuel gas injecting tubes 16 and the fuel gas collecting tubes 18 may be employed and their arrangement within the tank interior 20 may be tailored based on the shape and size of the fuel gas storage tank 10, the expected magnitude of the forces F experienced by the shell 12, and other design factors. For example, a plurality of fuel gas injecting tubes 16 may extend through the tank interior 20 in one direction and a plurality of fuel gas collecting tubes 18 may extend through the tank interior 20 in a direction perpendicular to the fuel gas injecting tubes 16. As another example, a plurality fuel gas injecting tubes 16 and a plurality of fuel gas collecting tube 18, which are spaced apart in alternating fashion, may all extend through the tank interior 20 in the same direction. Myriad other arrangements are of course possible.

As previously mentioned, the fuel gas injecting tubes 16 and the fuel gas collecting tubes 18 may contribute to the structural integrity of the shell 12 by helping to counteract the forces F imparted to the walls W from the tank interior 20 as a result of fuel gas storage. To do so, some or all of the fuel gas injecting tube(s) 16 and/or the fuel gas collecting tube(s) 18 are hermetically coupled to opposed portions of the shell 12, which may be generally planar portions of the same wall W or different walls W of the shell 12. The fuel gas injecting tube(s) 16 and the fuel gas collecting tube(s) 18 can be hermetically coupled to the shell 12 by different ways, techniques, components, and processes. The term "couple," as used herein, does not necessarily mean a mechanical interconnection between components like a bolt and nut threaded together, though it can mean this in some embodiments, and instead means direct or indirect engagement between components such as surfaces kept in contact with each other. Likewise, the term "engagement," as used herein, encompasses direct engagement between components, as well as indirect engagement between components such as where two components do not physically contact each other but nonetheless transmit forces to each other by way of another component like a washer situated between the two components. These are mere examples of what the terms mean in some embodiments, and their definitions are broader and embody all of the embodiments detailed in this description.

The hermetic coupling of the fuel gas injecting tube(s) 16 and the fuel gas collecting tube(s) 18 to the shell 12 can be achieved in numerous ways. In the embodiment depicted in FIG. 2, for example, the filter tube 28 (the construction of which can be employed for both the fuel gas injecting tube(s) 16 and the fuel gas collecting tube(s) 18) has a flange 48 at the first end 34 and a fitting 50 comprised of a nut 52 and a plug 54 at the second end 36 that can achieve hermetic couplings with the shell 12. The flange 48 preferably has a circular shape that extends radially outwardly from a circumference of the structural wall 30. The flange 48 can be unitary with the structural wall 30 or it can be a discrete piece attached to the wall 30 by welding, adhesion, a mechanical interlock, or some other way. The nut 52 at the opposite second end 36 of the filter tube 28 has inner threads engaged with, and tightened down on, outer threads that are disposed on the exterior of the structural wall 30. The plug 54 is preferably a sealing screw that has exterior threads engaged with, and tightened down on, inner threads disposed on the interior of the structural wall 30 so as to plug the filter tube 28 and seal the flow passage 32 at the second end 36.

The filter tube 28 in this embodiment is installed by inserting its internally and externally threaded second end 36 through one of the openings 22 in one of the walls W, and then through another opposite opening 22 in the same or different wall W. An inner surface 56 of the flange 48 engages an outer surface 58 of its respective wall W and an inserted end 60 of the fuel gas feed line 24 or the fuel gas extraction line 26 is received into the flow passage 32 at the first end 34 and sealed therein. On the opposite second end 36, the nut 52 is tightened down on the outer threads of the structural wall 30 of the filter tube 28, which protrudes past an outer surface 62 of its respective wall W, so that an inner surface 64 of the nut 52 engages that outer wall surface 62. The engaged surfaces 56, 58 and 62, 64 in the embodiment of FIG. 2 make surface-to-surface abutment. And though not illustrated, one or more o-rings or other gaskets can be disposed against the outer shell surfaces 58, 62 to help seal the first and second ends 34, 36 of the filter tube 28 against the shell 12. A cured epoxy sealant could also be disposed between the filter tube 28 and the shell 12 and/or one or more welds could be performed at the first and/or second ends 34, 36 of the filter tube 28 to help seal the filter tube 28 and the shell 12 and to further achieve a permanent fixation between the two components. If permanent fixing is not performed, and it does not necessarily have to be, the filter tube 28 can be decoupled and uninstalled from the shell 12 if necessary. In this way, the filter tube 28 can be serviced and repaired or replaced during the useful lifetime of the conformable fuel gas storage tank 10.

Figure 4:
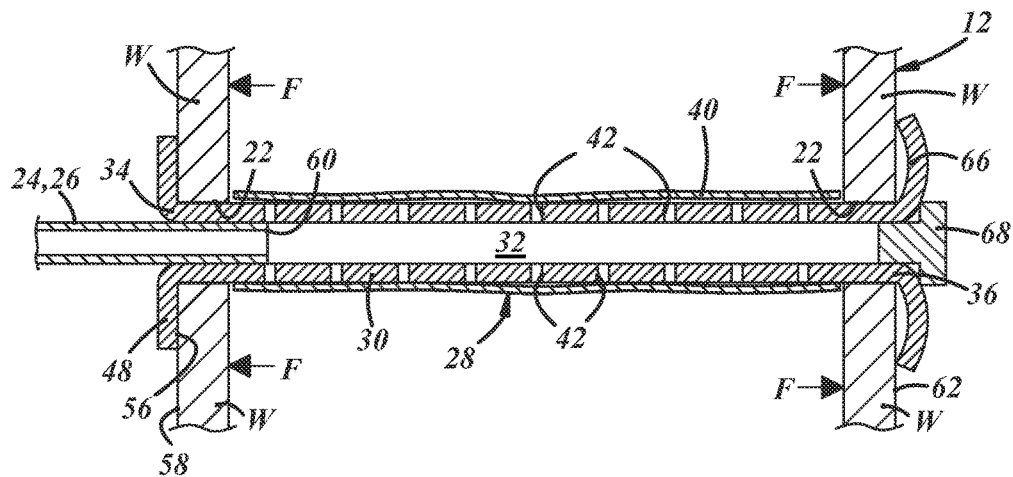
FIG. 4 is a cross-sectional illustration of yet another embodiment of a filter tube that can be used as the fuel gas injecting tube(s) and/or the fuel gas collecting tube(s)

FIG. 4 illustrates another way in which the first and second ends 34, 36 of the filter tube 28 can be hermetically coupled to the shell 12. Here, as shown, the second end 36 of the filter tube 28 includes a metal-worked portion 66 formed by a metalworking process. The metal-worked portion 66 is a flared terminal end of the structural wall 30 that would otherwise extend through the opening 22 of its respective wall W and past the outer surface 62 of the wall W. The metal-worked portion 66 is formed after insertion of the filter tube 28 through the shell 12. Specifically, the metal-worked portion 66 is formed by a metal spinning process that forcibly curls the terminal end of the structural wall 30 back into engagement with the outer surface 62 of the wall W. A plug 68 is then interference fit into the flow passage 32 at the second end 36 of the filter tube 28, and optionally welded in place or sealed in place with a cured epoxy sealant, to plug the filter tube 28 and seal the flow passage 32 at the second end 36. At the opposite first end 34, the filter tube 28 has the same flange 48 as previously-described with reference to FIG. 2. Since the metal spinning process is performed after the filter tube 28 has been inserted through the opposed openings 22 in the wall or walls W of the shell 12, the embodiment of FIG. 4 provides a somewhat permanent fixing between the filter tube 28 and shell 12. And again, here, o-rings or gaskets or other sealing elements can be included to help seal the filter tube 28 and the shell 12.

Figure 5:
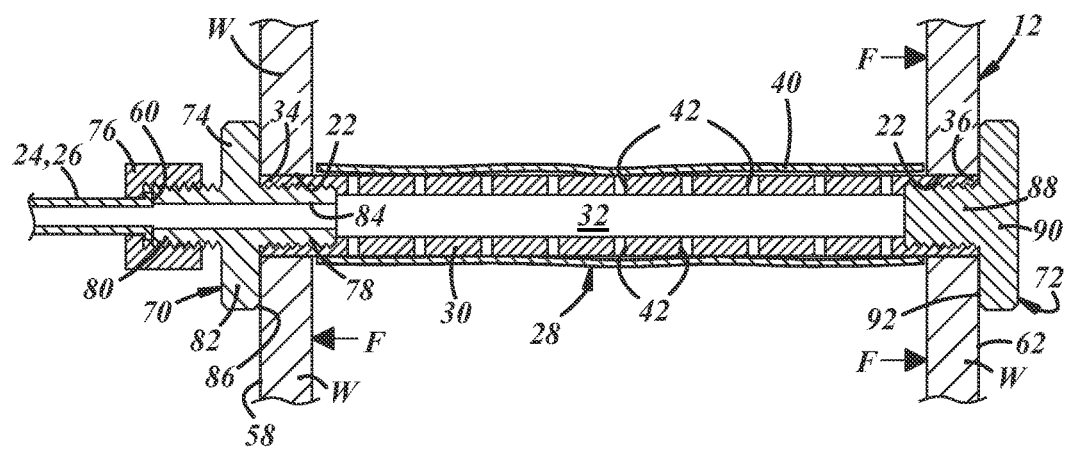
FIG. 5 is a cross-sectional illustration of still another embodiment of a filter tube that can be used as the fuel gas injecting tube(s) and/or the fuel gas collecting tube(s)

FIG. 5 illustrates yet another way in which the first and second ends 34, 36 of the filter tube 28 can be hermetically coupled to the shell 12. Here, in this embodiment, the filter tube 28 has a first fitting 70 at the first end 34 and a second fitting 72 at the second end 36. The first fitting 70 may be comprised of a t-fitting 74 and a nut 76. The t-fitting 74 has a first stem 78, a second stem 80, and a flange 82 that extends radially outwardly from and between the first and second stems 78, 80, with each of those features cooperating to define an internal passage 84 that extends through the t-fitting 74 to communicate with the flow passage 32 of the filter tube 28. The first stem 78 has outer threads that are engaged with, and tightened down on, inner threads disposed on the interior of the structural wall 30 of the filter tube 28. When so disposed, an inner surface 86 of the flange 82 engages the outer surfaces 58 of its respective wall W, which, here, amounts to surface-to-surface abutment. Moreover, the second stem 80 has outer threads that are engaged by inner threads of the nut 76, which is tightened down on the second stem 80. Such tightening of the nut 76 on the second stem 80 of the t-fitting 74 brings the inserted end 60 of the fuel gas feed line 24 or the fuel gas extraction line 26, which is received in the nut 76, into alignment with the internal passage 84 of the first fitting 70 to facilitate fuel gas delivery into or out of the flow passage 32 of the filter tube 28.

The second fitting 72 on the opposite second end 36 may be a plug 88 that, like before, plugs the filter tube 28 and seals the flow passage 32 at the second end 36. The plug 88 is preferably a sealing screw that has exterior threads engaged with, and tightened down on, inner threads disposed on the interior of the structural wall 30. A flange 90 of the sealing screw has an inner surface 92 that engages the outer surface 62 of its respective wall W. The engaged surfaces 58, 86 and 62, 92 in the embodiment of FIG. 5 also make surface-to-surface abutment although, as before, o-rings or gaskets or other sealing elements can be included to help provide a seal between the shell 12 and the first and second ends 34, 36 of the filter tube 28. The filter tube 28 can be decoupled and uninstalled from the shell 12 for servicing, if needed, by unscrewing the various components of the first and second fittings 70, 72 and removing the filter tube 28 from the shell 12.

Still, in other embodiments not expressly shown and described here, the first and second ends 34, 36 of the filter tube 28 can be coupled to the shell 12 in other ways. Other coupling techniques can include other components like additional fittings, parts, gaskets, seals, washers, rivets, and clamps; can include other processes like press-fitting, welding, adhesion, curing, staking, and soldering; or can include a combination of these coupling components and processes, as well as those detailed elsewhere in this description. The filter tube 28 can also be installed in the shell 12 by other techniques not expressly mentioned here such as, for example, by installing the tubes 28 from the interiors of two disjoined shell halves that are later joined together into the shell 12 by welding or heat fusion.

In addition to transporting fuel gas into and out of the common tank interior 20 when employed to function as a fuel gas injection tube 16 or a fuel gas collecting tube 18, respectively, the filter tube 28 supports the shell 12 against the forces F that result from the pressures experienced in the tank interior 20. The filter tube 28 counteracts the outwardly-directed forces F acting on the walls W of the shell 12 from the tank interior 20 so that the walls W do not unacceptably bow, crack, or otherwise deform. This functionality is provided in large part by the hermetic couplings of the first and second ends 34, 36 of the filter tube 28 and their engagement with the wall(s) W of the shell 12, and is only enhanced as the number of filter tubes 28 (and thus the number of fuel gas injecting and fuel gas collecting tubes 16, 18) installed in the fuel gas storage tank 10 increases. For these reasons, especially in larger fuel gas storage tanks 10 that are designed for fuel gas storage on-board a motor vehicle, a plurality of fuel gas injecting tubes 16 and a plurality of fuel gas collecting tubes 18, such as anywhere from five to fifty of each type, are typically installed in the tank 10.

While the shell 12 and filter tube 28 couplings can take on different configurations and therefore can engage and provide their shell reinforcing functionality in different ways, in the embodiment of FIG. 2, for example, the inner surface 56 of the flange 48 abuts the outer surface 58 of the wall W and accordingly supports the wall W against the forces F near that portion of the wall W. On the other end of the filter tube 28, the inner surface 64 of the nut 52 similarly abuts the outer surface 62 of the wall W and supports that portion of the wall W against the forces F. In the embodiment of FIG. 4, the inner surface 56 of the flange 48 abuts the outer surface 58 of its wall W, and the metal-worked portion 66 abuts the outer surface 62 of its wall W, and again the result is that the two walls W are supported against the forces F acting from the tank interior 20. As yet another example, in the embodiment of FIG. 5, the inner surfaces 86, 92 of the two flanges 82, 90 abut the outer surfaces 58, 62 of their respective walls W support the walls W against the forces F. Still, in other embodiments, a flange or other component embedded inside of and completely enveloped by the wall W could constitute the engagement that supports the wall against the forces F, among other possibilities.

Figure 6:
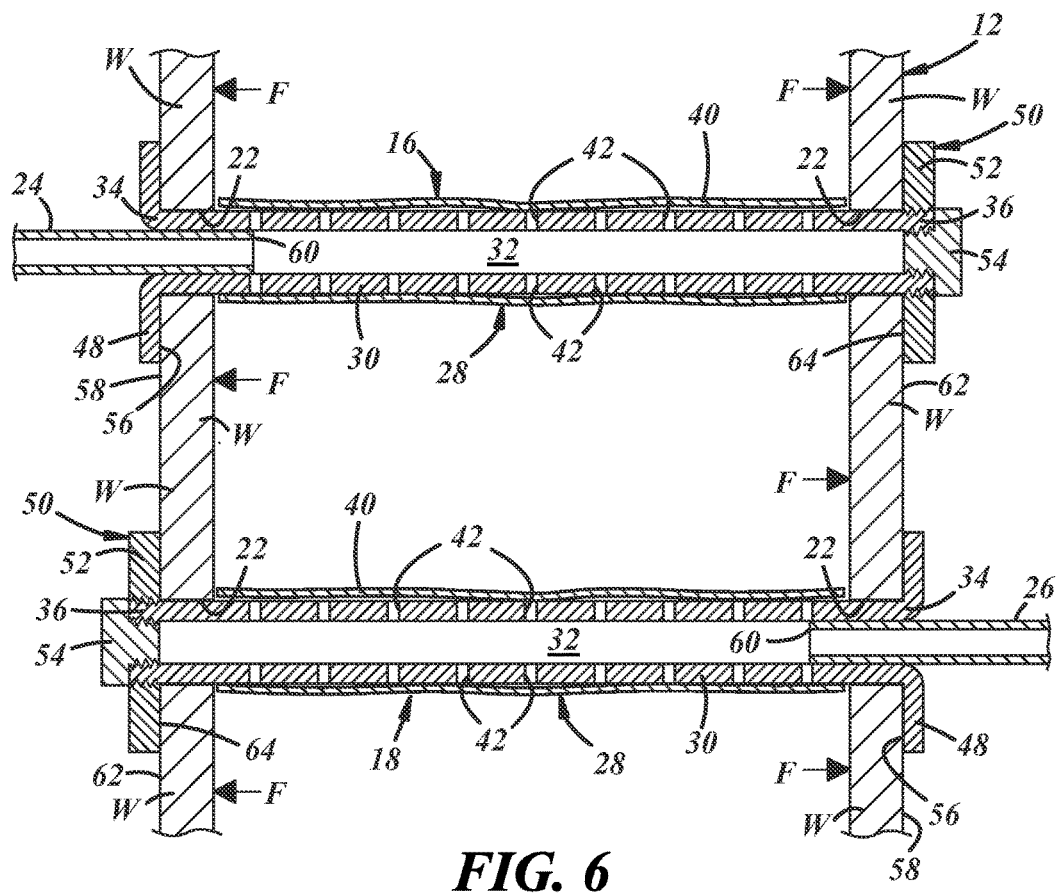
FIG. 6 is a partial cross-sectional illustration of one embodiment of the fuel gas storage tank along with a single fuel gas injecting tube and a single fuel gas collecting tube.

The fuel gas injecting tube(s) 16 and the fuel gas collecting tube(s) 18 are not only useful in providing additional structural integrity to the shell 12, but they also help efficiently charge fuel gas into the fuel gas storage material 14 in a reasonable amount of time. Referring now to FIG. 6, a single fuel gas injecting tube 16 and a single fuel gas collecting tube 18 are depicted to illustrate how fuel gas is introduced into the tank interior 20 for charging onto the fuel gas storage material 14 while using an external circuit to reject heat that is generated as a result of the exothermic charging process. Here, the filter tube constructions shown in FIG. 2 are shown for demonstrative purposes, but skilled artisans will appreciate that any of the other filter tube constructions shown in FIGS. 3-5, as well as others not shown, can be used instead. Furthermore, while only one fuel gas injecting tube 16 and one fuel gas collecting tube 18 are shown here for simplicity, skilled artisans will appreciate and understand that a fuel gas storage tank 10 that includes a plurality of each type of tube will function in generally the same way.

To begin, fuel gas is introduced into the flow passage 32 of the fuel gas injecting tube 16 from the fuel gas feed line 24. The fuel gas supplied to the fuel gas feed line 24 can originate from any suitable fuel gas source. For instance, the fuel gas may be sourced from a tapped residential or commercial gas distribution network or a large underground storage tank that supplies fuel gas at a pressure ranging from about 1 bar to about 50 bar. It is also possible, as another example, for the fuel gas to be sourced from a compressed fuel gas tank that stores fuel gas at a pressure greater than 200 bar. The compressed fuel gas tank may be outfitted with a Joule-Thompson valve and an expansion tank that, together, throttle the compressed fuel gas to a lower pressure of about 1 bar to about 50 bar for delivery to the fuel gas injecting tube 16. Still further, the fuel gas may be sourced from a cryogenic tank that holds liquefied fuel gas at a pressure of up to about 2 bar. A heat exchanger may be used in conjunction with the cryogenic tank to evaporate the liquified fuel gas for delivery to the fuel gas injecting tube 16.

Figure 8:
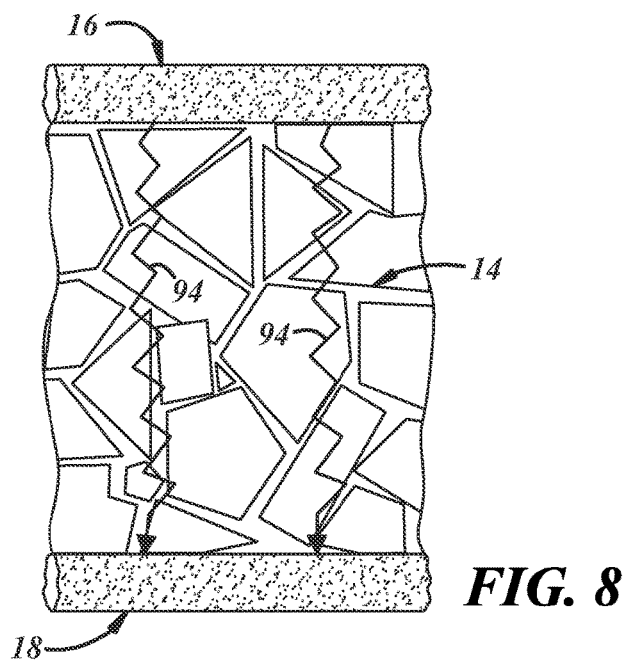
FIG. 8 is a schematic illustration depicting the diffusion of fuel gas through the tank interior between a fuel gas injecting tube and a fuel gas collecting tube.

Once the fuel gas enters the flow passage 32 of the fuel gas injecting tube 16, it begins to diffuse out of the flow passage 32 and into the tank interior 20 where the fuel gas storage material 14 is contained. Here, in this embodiment, the fuel gas diffuses through the openings in the structural wall 30, which are spaced apart holes 42, and through the membrane 40 in order to pass out of the flow passage 32 and into the tank interior 20. The fuel gas then navigates the tank interior 20 while being exposed to the fuel gas storage material 14 such that the fuel gas diffuses through the interstitial spaces (capillary system) of fuel gas storage material 14 and/or the internal pore system of the fuel gas storage material crystals, as shown generally by jagged arrows 94 in FIG. 8. Some of the fuel gas is charged (by adsorption, chemical uptake, etc.) into the fuel gas storage material 14 at this time and the rest continues passing through the tank interior 20 towards the fuel gas collecting tube 18. Eventually, the fuel gas that is not charged into the fuel gas storage material 14 arrives at the fuel gas collecting tube 18 where it diffuses out of the tank interior 20 and into the flow passage 32 of the collecting tube 18. The fuel gas captured by the collecting tube is carried out of the tank interior 20 by the fuel gas extraction line 26. The process of directing fuel gas through the tank interior 20 between the fuel gas injecting and fuel gas collecting tubes 16, 18 is carried out until the tank 10 has reached its capacity or a desired amount of fuel gas has accumulated in the tank interior 20.

The fuel gas that passes from the fuel gas injecting tube 16 to the fuel gas collecting tube 18 helps maintain the thermodynamics associated with a high rate of fuel gas charging by absorbing heat that is generated within the tank interior 20 (as a result of fuel gas being charged into the fuel gas storage material 14) and removing that heat from the tank 10 as it exits the tank interior 20 in the fuel gas extraction line 26. Removing heat from the tank interior 20 promotes a higher fuel gas charging rate because the heat generated by the charging process (e.g., adsorption or chemical uptake) can raise the temperature of the fuel gas storage material 14 which, in turn, works to release some of its already-stored fuel gas. In other words, if the fuel gas storage material 14 increases in temperature during charging, the rate at which fuel gas is accumulated within the material 14 is reduced (that is, the difference between the competing rates of fuel gas charging and release converge as the temperature of the fuel gas storage material 14 increases). In the embodiment shown in FIG. 6, the fuel gas that diffuses into the fuel gas collecting tube 18 and any heat that it absorbs is directed by the fuel gas extraction line 26 to an external circuit where the temperature of the fuel gas flow is reduced by, for example, a heat exchanger. The fuel gas flow may then be re-circulated directly back to the tank interior 20 through the fuel gas feed line 24 or it may be returned to a common reservoir that supplies the fuel gas feed line 24, among other possibilities. A specific example of a system and method for cooling and re-circulating fuel gas from the fuel gas extraction line 26 back into the tank interior 20 is described in International Application No. PCT/US2014/062607, the entire contents of which are hereby incorporated by reference.

Figure 7:
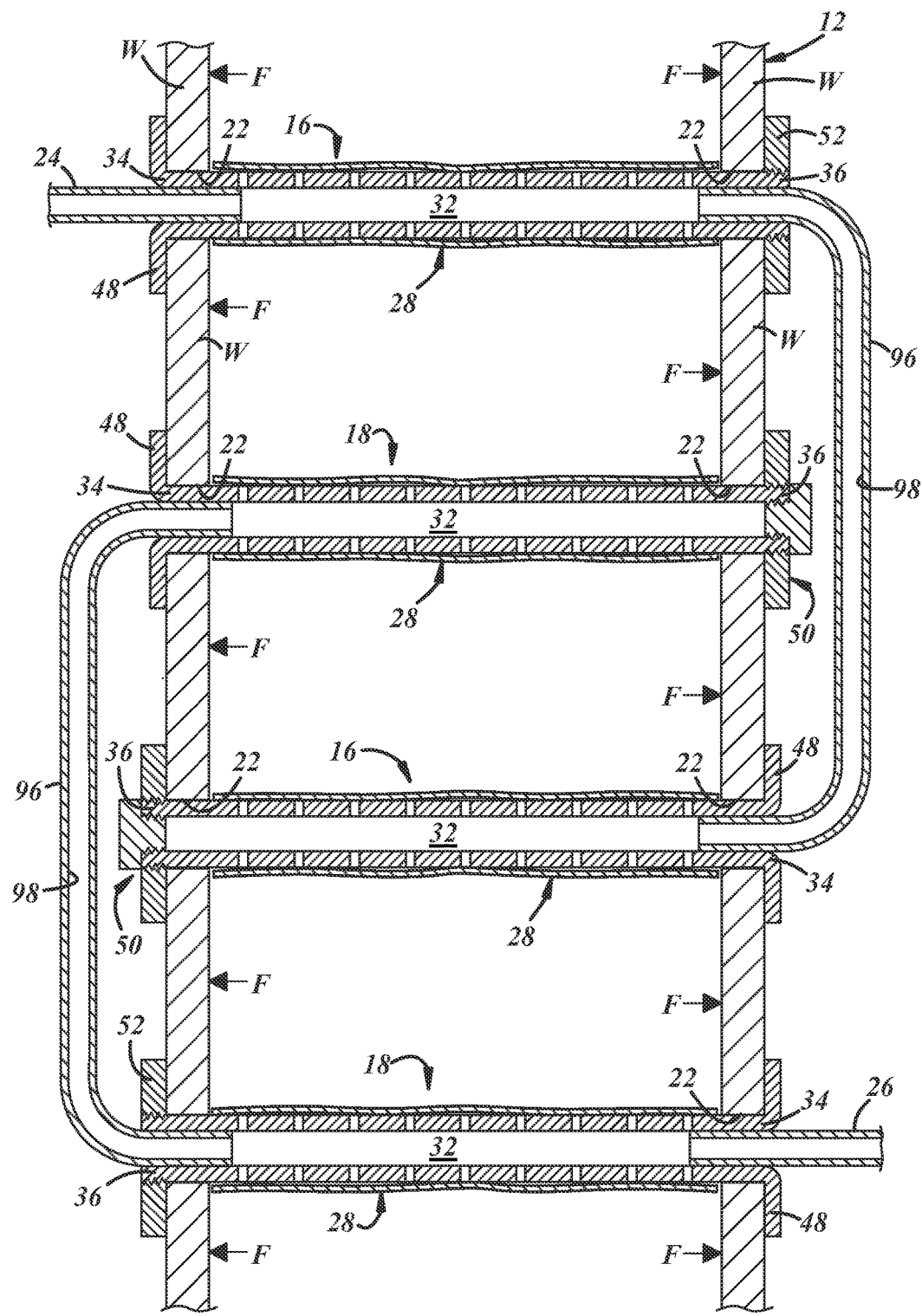
FIG. 7 a partial cross-sectional illustration of another embodiment of the fuel gas storage tank along with a pair of fuel gas injecting tubes and a pair of fuel gas collecting tubes, with each pair of tubes being fluidly connected by a connecting tube that is routed external to the tank shell.

The fuel gas injecting tube 16 and the fuel gas collecting tube 18 shown in FIG. 6 are both plugged at their second ends 36. Such plugging, however, is not mandatory in every implementation of the fuel gas storage tank 10. For example, as shown in FIG. 7, two or more of the fuel gas injecting tubes 16 and/or two or more of the fuel gas collecting tubes 18 may be fluidly connected by a connecting tube 96. Each connecting tube 96 is routed external to the shell 12 between the second end 36 of one filter tube 28 and the first end 34 of another filter tube 28 in order to establish a connecting flow passage 98 between the two flow passages 32 of the filter tubes 28. The connecting tube 96 is not permeable to fuel gas and, as such, is preferably a solid pipe or other non-fuel-gas-permeable guide structure. The walls that make up the solid body of the connecting tube 96 can have a thickness that ranges from about 0.5 mm to about 1 mm, and they can provide the connecting pipe 96 with a diameter to an outer surface that ranges from about 3 mm to about 30 mm or from about 5 mm to about 10 mm. Of course other thickness and diameter values are possible. The connecting tubes 96 can be made from the same material as the structural wall 30 of the filter tubes 28 or they can be composed of a different material such as brass or some other suitable metal.

The connecting tubes 96 can be connected to the filter tubes 28 that function as the fuel gas injecting and fuel gas collecting tubes 16, 18 by different ways, techniques, components, and processes. The exact connection may depend on the materials selected for the connecting tubes 96 and the filter tubes 28, among other factors. In the embodiment of FIG. 7, for example, the connecting tubes 96 are connected to the pair of fluidly adjoined filter tubes 28 by way of a press-fit in which the connecting tubes 96 are forcibly inserted inside of the flow passages 32 of the filter tubes 28 to an overlapping extent sufficient to maintain their connection and preclude gas leakage. To facilitate the press-fit, the inserted ends of the connecting tube 96 can be immersed in liquid nitrogen to temporarily physically shrink the pipe ends before insertion, followed by natural expansion of the tube ends after insertion as they heat back up to ambient temperature. As another example, which is shown in FIG. 5, the connecting tube 96 can be connected to the filter tube 28 by tightening down the nut 76 over and to capture a flange on the end of the connecting tube 96. Yet in other embodiments the connection could include other components like additional fittings, parts, gaskets, seals, o-rings, washers, rivets, and clamps; can include other processes like welding, adhesion, curing, staking, and soldering; or can include a combination of these connection components and processes, as well as those detailed above.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A fuel gas storage tank comprising:
a shell that defines a tank interior;
a fuel gas storage material housed within the tank interior, the fuel gas storage material being able to reversibly store fuel gas in a solid state;
one or more fuel gas injecting tubes disposed in the tank interior, each of the one or more fuel gas injecting tubes being permeable to fuel gas and fluidly communicating with a fuel gas feed line; and one or more fuel gas collecting tubes disposed in the tank interior, each of the one or more fuel gas collecting tubes being permeable to fuel gas and fluidly communicating with a fuel gas extraction line, wherein the one or more fuel gas injecting tubes and the one or more fuel gas collecting tubes are not directly connected to each other within the tank interior thereby allowing fuel gas to be exchanged between the one or more fuel gas injecting tubes and the one or more fuel gas collecting tubes only by diffusing through the tank interior while being exposed to the fuel gas storage material;

wherein the one or more fuel gas injecting tubes, the one or more fuel gas collecting tubes, or both, comprise a filter tube that defines an internal flow passage extending between a first end and a second end, the filter tube being constructed to permit fuel gas to diffuse between the internal flow passage and the tank interior, and wherein the first end and the second end of the filter tube are hermetically coupled to opposed portions of the shell to counteract outwardly-directed forces acting on the shell from the tank interior.

2. The fuel gas storage tank set forth in claim 1, wherein the filter tube extends between opposed generally planar portions of the shell.

3. The fuel gas storage tank set forth in claim 1, wherein the filter tube is plugged at the second end to seal the internal passage at the second end.

4. The fuel gas storage tank set forth in claim 1, wherein the one or more fuel gas injecting tubes, the one or more fuel gas collecting tubes, or both, comprise a plurality of filter tubes, each of the filter tubes defining an internal flow passage that extends between a first end and a second end, and each of the filter tubes being constructed to permit fuel gas to diffuse between the internal flow passage and the tank interior located outside of the filter tube.

5. The fuel gas storage tank set forth in claim 4, wherein the second end of one filter tube and the first end of another filter tube, both filter tubes being either fuel gas injecting tubes or fuel gas collecting tubes, are fluidly connected by a connecting tube to establish a connecting flow passage between the internal flow passage of the one filter tube and the internal flow passage of the other filter tube.

6. The fuel gas storage tank set forth in claim 5, wherein the connecting tube is not fuel gas permeable and is routed external to the shell.

7. The fuel gas storage tank set forth in claim 1, wherein each of the one or more fuel gas injecting tubes and the one or more fuel gas collecting tubes comprises a plurality of filter tubes that extend between opposed portions of the shell, each of the plurality of filter tubes that function as the one or more fuel gas injecting tubes fluidly communicating with the fuel gas feed line, and each of the plurality of filter tubes functioning as the one or more fuel gas collecting tubes fluidly communicating with the fuel gas extraction line.

8. The fuel gas storage tank set forth in claim 1, wherein the fuel gas storage material is able to reversibly store natural gas or hydrogen gas in a solid state.

9. The fuel gas storage tank set forth in claim 1, wherein the fuel gas storage material comprises a metal-organic-framework.

10. The fuel gas storage tank set forth in claim 1, wherein the fuel gas storage material is an adsorbed natural gas storage material and the operating pressure of the tank within the tank interior ranges from 35 bar to 60 bar, or wherein the fuel gas storage material is a hydrogen storage material and the operating pressure of the tank within the tank interior ranges from 10 bar to 100 bar.

11. A fuel gas storage tank comprising:
a shell that defines a tank interior;
a fuel gas storage material housed within the tank interior, the fuel gas storage material being able to reversibly store natural gas or hydrogen gas in a solid state;
a fuel gas injecting tube fluidly communicating with a fuel gas feed line, the fuel gas injecting tube comprising a filter tube that defines an internal flow passage extending between a first end and a second end of the filter tube, the first end of the filter tube being hermetically coupled to one portion of the shell and the second end of the filter tube being hermetically coupled to another portion of the shell, and wherein the filter tube that functions as the fuel gas injecting tube is permeable to fuel gas; and
a fuel gas collecting tube fluidly communicating with a fuel gas extraction line, the fuel gas collecting tube comprising a filter tube that defines a flow passage extending between a first end and a second end of the filter tube that functions as the fuel gas collecting tube, the first end of the filter tube that functions as the fuel gas collecting tube being hermetically coupled to one portion of the shell and the second end of the filter tube that functions as the fuel gas collecting tube being hermetically coupled to another portion of the shell, and wherein the filter tube that functions as the fuel gas collecting tube is permeable to fuel gas;
wherein the internal flow passage of the filter tube that functions as the fuel gas injecting tube and the internal flow passage of the filter tube that functions the fuel gas collecting tube are not directly connected to each other within the tank interior.

12. The fuel gas storage tank set forth in claim 11, wherein the shell is not cylindrical or spherical in shape.

13. The fuel gas storage tank set forth in claim 11, wherein the tank comprises a plurality of fuel gas injecting tubes and a plurality of fuel gas collecting tubes, each of the plurality of fuel gas injecting tubes and the plurality of fuel gas collecting tubes being a filter tube that defines an internal flow passage extending between a first end and a second end of the filter tube, wherein the first and second ends of the filter tubes that function as the fuel gas injecting tubes are hermetically coupled to opposed portions of the shell, and wherein the first and second ends of the filter tubes that function as the fuel gas collecting tubes are hermetically coupled to opposed portions of the shell.

14. The fuel gas storage tank set forth in claim 13, wherein the first ends of the filter tubes that function as the fuel gas injecting tubes fluidly communicate with the fuel gas feed line and second ends of the same filter tubes are plugged to seal the internal passages of those filter tubes at their second ends, and wherein the first ends of the filter tubes that function as the fuel gas collecting tubes fluidly communicate with the fuel gas extraction line and second ends of the same filter tubes are plugged to seal the internal passages of those filter tubes at their second ends.

15. The fuel gas storage tank set forth in claim 13, wherein the second end of at least one of the filter tubes that functions as a fuel gas injecting tube is fluidly connected to the first end of another filter tube that functions as a fuel gas injecting tube by a connecting tube that is not fuel gas permeable and is routed outside of the shell, and wherein the second end of at least one of the filter tubes that functions as a fuel gas collecting tube is fluidly connected to the first end of another filter tube that functions as a fuel gas collecting tube by a connecting tube that is not fuel gas permeable and is routed outside of the shell.

16. A method of filling a fuel gas storage tank with fuel gas for storage of the fuel gas in a solid state, the method comprising:
providing a fuel gas storage tank that comprises a shell, which defines a tank interior, and a fuel gas storage material housed within the tank interior that is able to reversibly store fuel gas in a solid state;
delivering fuel gas to at least one fuel gas injecting tube disposed within a tank interior, the fuel gas injecting tube being permeable to fuel gas such that fuel gas delivered into the fuel gas injecting tube diffuses into the tank interior, and wherein the fuel gas injecting tube defines a flow passage extending from a first end to a second end, the first and second ends of the fuel gas injecting tube being hermetically coupled to opposed portions of the shell; and
removing fuel gas from the tank interior and into at least one fuel gas collecting tube disposed within the tank interior, the fuel gas collecting tube being permeable to fuel gas such that fuel gas in the tank interior diffuses into the fuel gas collecting tube and is removed from the tank interior, wherein the fuel gas collecting tube defines a flow passage extending from a first end to a second end, the first and second ends of the fuel gas collecting tube being hermetically coupled to opposed portions of the shell, wherein the fuel gas collecting tube and the fuel gas injecting tube are not directly connected within the tank interior thereby allowing fuel gas to be passed from the fuel gas injecting tube to the fuel gas collecting tube only by diffusing through the tank interior while being exposed to the fuel gas storage material.

17. The method set forth in claim 16, wherein the fuel gas storage material housed within the tank interior comprises a metal-organic-framework, and the fuel gas that is delivered to the fuel gas injecting tube is natural gas.

18. The method set forth in claim 16, wherein the at least one fuel gas injecting tube comprises a plurality of fuel gas injecting tubes and the at least one fuel gas collecting tube comprises a plurality of fuel gas collecting tubes, each of the plurality of fuel gas injecting tubes and the plurality of fuel gas collecting tubes being a filter tube that defines an internal flow passage extending between a first end and a second end of the filter tube, wherein the first and second ends of the filter tubes that function as the fuel gas injecting tubes are hermetically coupled to opposed portions of the shell, and wherein the first and second ends of the filter tubes that function as the fuel gas collecting tubes are hermetically coupled to opposed portions of the shell.

* * * * *